United States Patent [19]

Aughton

[11] 4,125,864
[45] Nov. 14, 1978

[54] BEAM SPLITTER

[75] Inventor: John E. Aughton, London, England

[73] Assignee: Crosfield Electronics Limited, London, England

[21] Appl. No.: 773,212

[22] Filed: Mar. 1, 1977

[30] Foreign Application Priority Data

Mar. 3, 1976 [GB] United Kingdom ............... 8517/76

[51] Int. Cl.² ................. H04N 5/86; G03B 27/78; G02B 5/04; G03B 21/14
[52] U.S. Cl. ............................ 358/298; 350/286; 353/82; 358/302
[58] Field of Search .............. 358/298, 302; 353/38, 353/81, 82; 350/182, 286, 157

[56] References Cited

U.S. PATENT DOCUMENTS

| 4,012,584 | 3/1977 | Gascoigne | 358/302 |
| 4,015,081 | 3/1977 | Starkweather | 358/302 |
| 4,025,189 | 5/1977 | Pugsley | 358/298 |

Primary Examiner—Daryl W. Cook
Attorney, Agent, or Firm—Kemon & Estabrook

[57] ABSTRACT

A beam splitter is disclosed in which a light beam entering a block of light-transmitting material is internally reflected a plurality of times between a pair of parallel sides, one side being coated to enhance such internal reflection and the other side having in the direction of its length a succession of areas which are differently coated to control the amount of the beam which is reflected internallly and the amount of the beam which emerges; a plurality of parallel emergent beams of substantially equal intensity can be obtained in this way. The application of such a beam splitter to an image-reproducing system is described, the beams contributing to the formation of half-tone dots in the image.

6 Claims, 5 Drawing Figures

BEAM SPLITTER

This invention relates to beam splitters and has a particularly advantageous application to an image-reproducing system of the kind in which a number of separate light beams are simultaneously scanned over an image recording surface, the light beams falling on points on that surface such that some or all of the light beams contribute to the formation of a single half-tone dot area. The beams contributing to a single half-tone dot area may be modulated with the same or with different image information for that area but with different half-tone information.

To split a beam into a number of parallel paths, it is known to use a combination of mirrors, at least some of which partially reflect and partially transmit light. Where more than a few parallel beams are required, for example where six beams are required, it is not generally practicable to have a single line of mirrors, each partially reflecting light into an output path and partially transmitting it to the next mirror, and in such cases the light paths must be more complicated. Consequently to obtain six parallel paths, nine or ten such mirrors may be required. In another known system, a reflector directs a beam at a suitable angle through three parallel spaced plates, each plate partially reflecting the beam.

According to the present invention, a beam splitter comprises a single block of light transmitting material having a pair of parallel sides a first of which has a coating such as to enhance the ability of that side for internal reflection, the other of the parallel sides having in the direction of its length a succession of areas which are differently coated, and which are so arranged that a beam entering the block at a given angle of incidence undergoes a series of internal reflections between the said parallel sides, a part of the beam emerging through a different one of the said coated areas each time the beam is internally incident at the said other of the parallel sides, the remaining part of the beam being thereafter at least partially reflected from the first side to the next coated area of the said other of the parallel sides.

In the preferred form, the incident beam enters the beam splitter through an end portion of the first side which is substantially free of the said reflecting coating. Also, the coatings of the said successive areas of the said other of the parallel sides is such that the emergent beams from that side are all of substantially equal intensity. However, attenuators may be used to correct for imbalances.

In this way, a number of parallel output beams of substantially equal intensity are obtained.

In order that the invention may be better understood, a beam splitter and apparatus employing such a beam splitter will now be described with reference to the accompanying drawings, in which.

Figure 1:
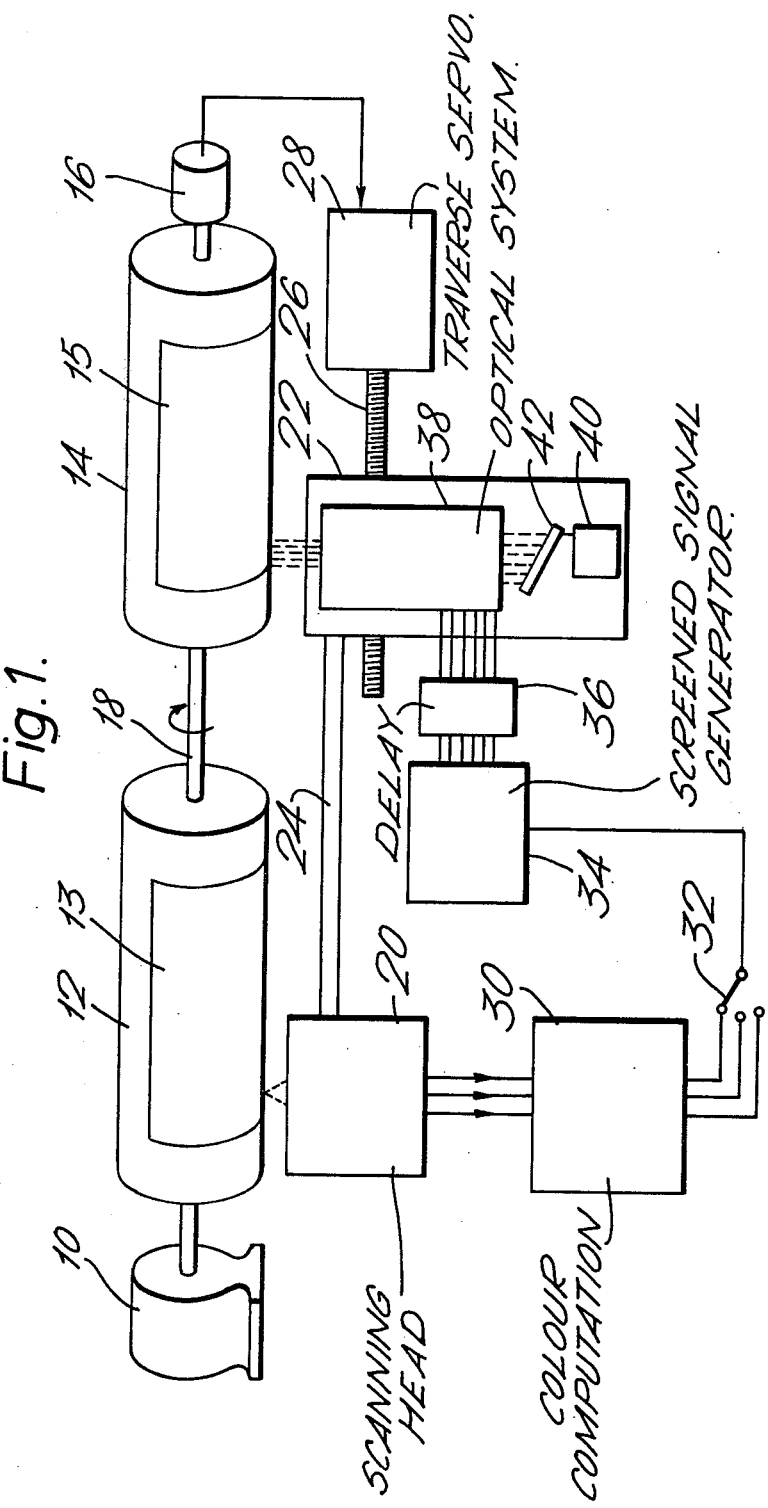
FIG. 1 shows image-reproducing means in which a beam splitter according to the invention may be employed.

In the image-reproducing apparatus shown in FIG. 1, a motor 10 drives an input drum 12, an output drum 14 and a shaft transducer 16 mounted on a common shaft. The input drum 12 carries the image 13 to be reproduced and this image is scanned by an analysing head 20. The output drum 14 carries a film 15 to be exposed to form a monochrome colour separation for a selected colour component. The film 15 is scanned by the multiple-output exposing head 22. These two heads are mechanically coupled through a member 24 and move together along a lead screw 26 controlled by a traverse servo 28 in turn controlled by the signals from the shaft transducer 16.

The output of the scanning head 20 is in the form of three colour channel signals (red filter, blue filter and green filter) and these signals are fed to a colour computation unit 30 in which corrections are introduced in a manner known in itself, the value of the correcting signal for one channel depending at least partially upon the values of the signals in the other channels. At the output of the colour computation unit 30, one of the three corrected colour signals is chosen by means of a colour-component selector switch 32 and is applied to a multiple-signal generator 34. This generates six signals which, in this example, are composed of the common signal from the colour computation unit 30 each in combination with a different screen-representing signal. The resulting screened and corrected colour signals are applied through a delay unit 36 to an optical system 38 in the exposing head 56. The optical system 38, which will be described in greater detail with reference to FIG. 2, includes individual modulators for six beams derived from a laser 40 by means of a beam splitter 42. The modulated beams are incident on the film 15 to be treated on the cylinder 14. Together, the six light beams contribute to the making of the half-tone exposure dots in the colour separation. They may contribute to two adjacent dots at any instant.

An image-reproducing system including a screened signal generator employing combinations of shift registers and signal generating units is described in application Ser. No. 545,179 of Jan. 29, 1975 in the name of Richard M. Gascoigne, U.S. Pat. No. 4,012,584. Such a screened signal generator may be used in the reproducing system described above.

Figure 2:
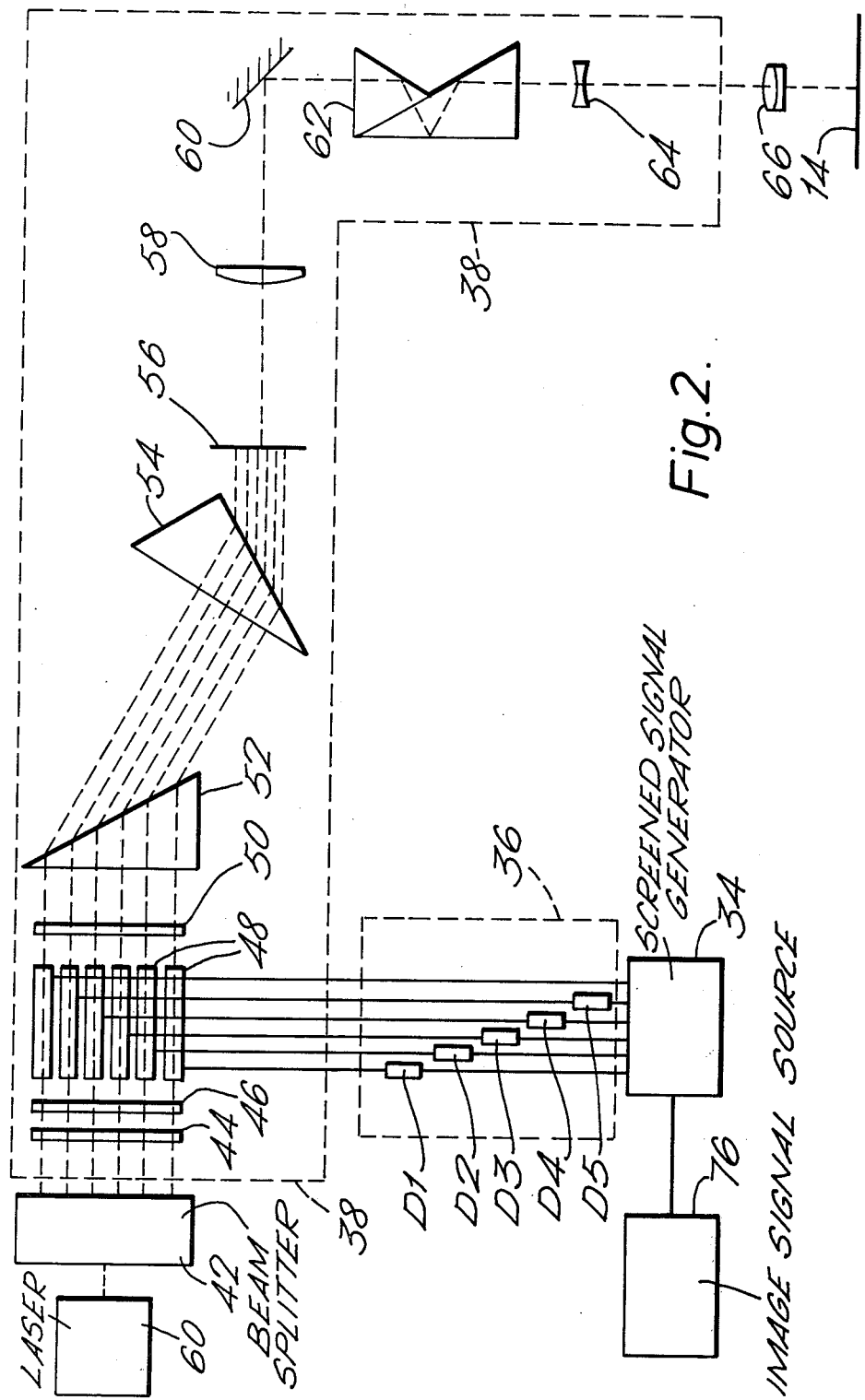
FIG. 2 shows the optical system of FIG. 1, including the light source and beam splitter.

In FIG. 2, the laser 40, which may be a 10 mw Argon laser (Spectra-physics Model 162) operating at 488 nm, generates a coherent light beam which is applied to the beam splitter 42. In this example, the beam splitter 42 splits the original beam into six parallel beams which are applied through a half-wave plate 44 to a modulator system. The modulator system comprises an input polariser plate 46 and an output polariser plate 50 separated by electro-optic modulators 48, by means of which each of the light beams can be separately modulated. The modulated beams pass through prisms 52 and 54 which serve for anamorphic beam compression and the resulting closely spaced beams fall on a mask 56. The mask 56 contains six apertures defining the shape required for the beam cross-sections at the image-recording surface. Beams passing through the mask 56 (represented for simplicity by a single beam in the drawing) are collected by a field lens 58 and are reflected by a mirror 60 to a prism 62. The prism 62 is of the kind known as a "reversion prism". If the grooved surface of the prism is considered as its top, a beam incident on the prism is reversed in the top-to-bottom sense (180° rotation) but not in the lateral sense (0° rotation). A vector in an intermediate position is rotated by an intermediate amount.

Light leaving the reversion prism 62 passes through a negative lens 64 and a focusing lens 66 before falling on the film 15 on the surface of the cylinder 14.

In application Ser. No. 533,460 of Dec. 16, 1974 in the name of Peter C. Pugsley, U.S. Pat. No. 4,025,189, there is described an image-reproducing system in which a record medium is exposed by a row of light modulators and in which the areas of illumination of the record medium by adjacent tones of the individual light modulators overlap. The optical apparatus shown in FIG. 2 is intended for use in such a system. For this reason, the apertures of the mask 56 are of the form shown in FIG. 3.

Figure 3:
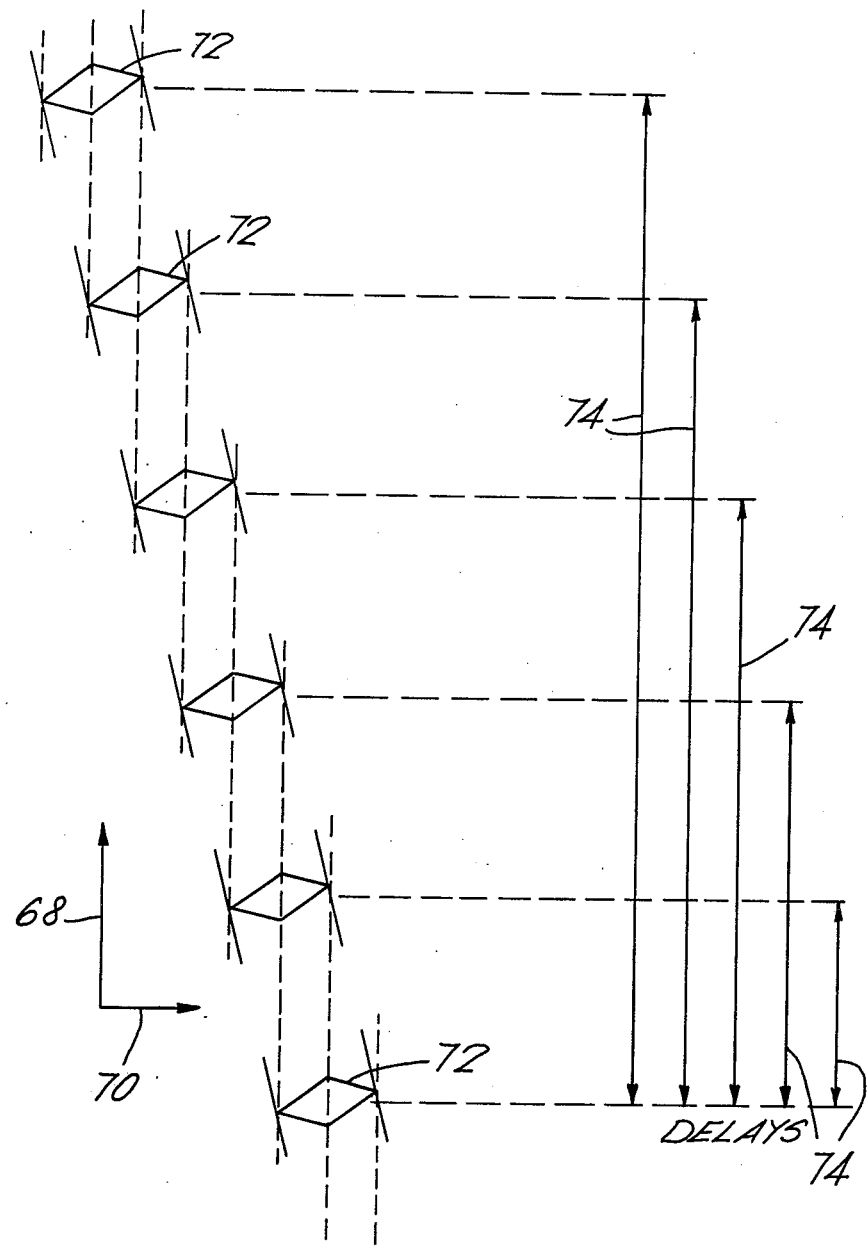
FIG. 3 illustrates the shape of the apertures of the mask of FIG. 2.

FIG. 3 illustrates the pattern and shape of the apertures on the mask and also the pattern and shape of the beam spots as they fall on the film 15. The arrow 68 represents the direction of rotation of the cylinder and the arrow 70 represents the direction of slow traverse of the scanning head with respect to the cylinder. It will be seen that each aperture of the mask and consequently each spot 72 is shaped as a parallelogram and that a line through the centres of the parallelograms is oblique with respect to the direction of rotation of the cylinder. It will also be seen that one half of each parallelogram is in line, in the direction of rotation, with the other half of the next parallelogram. Thus each track in the direction of rotation is scanned by two adjacent spots 72, one after the other. In addition, the light passing through each of the parallelogram apertures will have a triangular intensity profile when integrated in the direction of rotation and their tracks overlap in the manner required by the above-mentioned specification disclosing overlapping areas of illumination.

The arrows 74 represent the delays which must be applied to the electrical signals controlling the modulation of the beams to compensate for the delay in the times at which different scanning beams cross the same half-tone dot area.

Returning now to FIG. 2, each of the modulators 48 has a pair of electrodes for each light channel. Five of the electrode pairs are connected through delay circuits D1 to D5 to the output of the screened signal generator 34, the other pair of electrodes being coupled directly to the circuit 34. The circuit 34 receives the image-representing signal from a source 76, corresponding to the units 12, 20, 30 and 32 of FIG. 1.

By rotating the prism 62 the angle of the line of scanning spots 72 (FIG. 3) with respect to the direction 68 of cylinder rotation can be adjusted without altering the axis of light travel. The prism 62 is conveniently constructed by cementing together a 30°-60°-90° prism and an equilateral prism. The input and output surfaces should be anti-reflection coated, for example with a single layer of MgF$_2$ optimised at the wavelength used. The base surface, at which the intermediate reflection occurs, should be silvered and protected and the "notch" surfaces should be polished.

The lens arrangement shown co-operates with the prism 62 to trim the spacing between scanning spots by adjusting magnification and thereby to trim the system to the delays applied to the modulating signals. In the system shown, the magnification setting using the lens arrangement affects "delay" mainly and affects the "line-fit" slightly; rotation of the prism 62 mainly affects "line-fit" and slightly affects "delay". The lens 66 images the mask at the required magnification (or, in practice, reduction) on the recording surface and lens 58 acts as a field lens and produces a "telecentric" condition. The lens 58 is separated from the mask by a distance which is about one tenth of its focal length, in which position it produces a magnification of about 1.1. By moving the lens a short distance, this magnification value can be varied slightly and hence provides a fine setting of delay.

Although the apertures are elongated in the traverse direction, in practice the resulting light will produce apparent elongation in the direction of rotation, owing to the finite rise time of the modulator amplifier drive signals, to give approximately equal resolution in the directions of rotation and traverse. It will be appreciated that the light profile also depends upon the distribution of illumination over the mask aperture but this effect can then be corrected if necessary by the mask shape.

The spacing of the beams in the direction of rotation prevents light from two adjacent spots falling on a single area of the surface to be treated at the same time and thereby avoids interference effects which would otherwise result from the overlapping of coherent light beams.

Beam compression also reduces the spacing of the illuminated areas in the direction of cylinder rotation and thereby reduces the required delays. A further advantage is that the reduction of the separation of the beam enables a smaller diameter lens 58 to be used, enabling a more compact system, particularly if the lens 58 is in a turret of alternative lenses. Such a turret permits easy change of screen ruling.

It is not essential to use delay circuits in the position shown in the drawing; instead, the relevant information may simply be read from a store at the appropriate time.

Suitable electro-optic modulators can be obtained from Electro-Optic Developments Ltd. of 117, High Street, Brentwood, Essex, England under the Type number PC 100/2 but other suitable Pockel and Kerr cell modulator devices are available.

Figure 4:
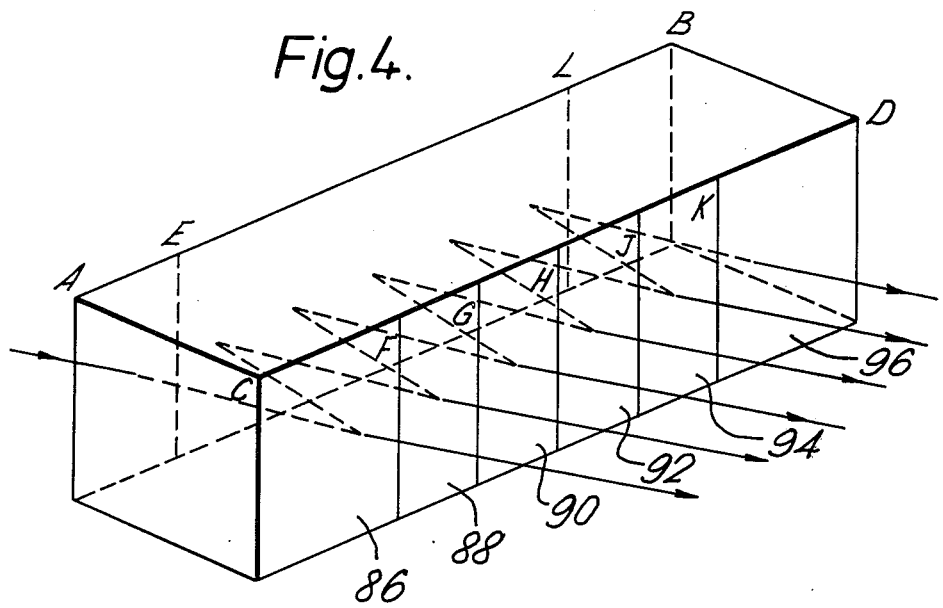
FIG. 4 is a perspective view of a beam splitting block embodying the invention.
Figure 5:
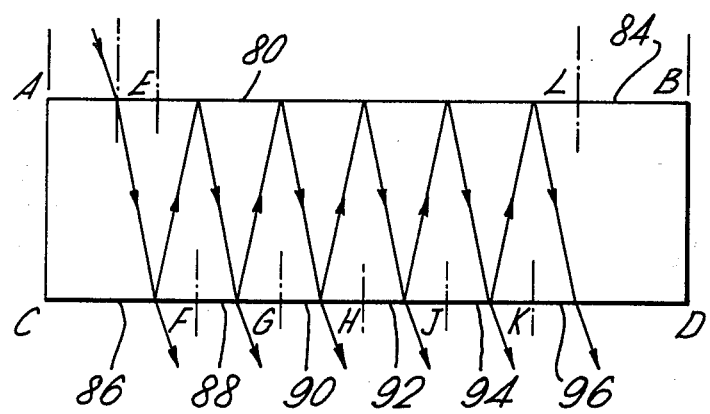
FIG. 5 is a plan view of the block, showing the path of the light beam within the block.

In FIGS. 4 and 5, the beam splitter 42 is of Chance stress-free glass and has a coating 80 on the major part of a first long side, this coating 80 falling short of the end pieces 82 and 84. In this example, the coating is such as to provide high internal reflection. The opposite side of the block has a number of differently coated zones 86, 88, 90, 92, 94 and 96. Each of these coatings is such as to permit a part of light internally incident on that surface to be reflected and a part of the light to be transmitted out of the block.

Referring now to FIG. 5, a light beam incident at an angle of 19.3° at the end 82 of the first side of the block is partially reflected from and partially transmitted through the coated area 86 of the opposite side of the block. That part of the beam which is internally reflected from the surface 86 is further reflected from the coated surface 80 of the first side of the block and then again partially reflected from and partially transmitted through the said opposite side, at the coated area 88. The beam emerging from the area 88 is parallel with the beam emerging from the area 86. The beam undergoes five internal reflections at the coated portion 80 of the first side and five partial internal reflections at the area 86, 88, 90, 92 and 94 of the opposite side to produce six parallel output beams.

The coating 80 is such as to provide the highest possible internal reflection. The coatings on the opposite side are so related to one another in their ability to transmit light that the six parallel output beams are all of substantially equal intensity. The coating 96 is an anti-reflection coating but may be slightly absorbing if the intensity of the final beam requires adjustment.

Coating may be carried out by laying down alternate quarter-wave layers of magnesium fluoride and titanium dioxide until the required reflection/transmission ratio is achieved. When Chance zero-stress glass is used as a substrate, typical reflectance values for the regions shown by the letters in FIG. 5 are:

| Region | Reflectance |
|--------|-------------|
| AE | 8% |
| CF | 86% |
| FG | 82.5% |
| GH | 77.5% |
| HJ | 69% |
| JK | 52% |
| KD | 2% |
| EL | 99% |

Region AE is coated to prevent tarnishing of the glass.

For an application requiring two sets of parallel beams, it would be possible to replace the coating 80, designed for high internal reflection, by a succession of coatings similar to the coatings 86 to 94. In this case, parallel beams would emerge from this first side of the block. If these parallel beams were to be equal in number to the first set of parallel beams, the coating at area 96 would have to ensure partial reflection of the beam. Like the area 82, the area 84 can be given an anti-reflection coating.

We claim:

1. A beam splitter comprising a single block of light-transmitting material having a pair of parallel sides, a first of which has a coating which enhances the ability of that side of internal reflection, the other of the said parallel sides having in the direction of its length a succession of areas which are differently coated and which are so arranged that a beam entering the block at a given angle of incidence undergoes a series of internal reflections between the said parallel sides, a part of the beam emerging through a different one of the said coated areas each time the beam is internally incident at the said other of the parallel sides and the remaining part of the beam being thereafter at least partially reflected from the first side to the next coated area of the said other of the parallel sides.

2. A beam splitter in accordance with claim 1, in which the coatings of the said successive areas of the said other of the parallel sides are such that the emergent beams from that side are all of substantially equal intensity.

3. A beam splitter in accordance with claim 1, in which the incident beam enters the beam splitter through an end portion of the said first side which is substantially free of the said reflecting coating.

4. A beam splitter in accordance with claim 1, in which the coating of the said first of the parallel sides permits emergence of some light from that side and is such as to provide different degrees of attenuation of emerging light in successive areas of that side.

5. Beam splitting and modulating apparatus, comprising a laser, a beam splitter in accordance with claim 1, and electro-optic modulating means arranged to pass all beams from the beam splitter for separately modulating each beam.

6. Image reproducing apparatus of the kind in which a number of separate light beams are simultaneously scanned over an image-recording surface, the light beams falling on points of that surface such that all the light beams contribute to the formation of a single halftone dot area, including a source of image data to be reproduced, means responsive to the image data to generate for each dot area a number of signals representing the screened image, a record surface to be treated for the reproduction of the image, and beam splitting and modulating apparatus in accordance with claim 5, the electro-optic modulating means being responsive to the said signals to modulate respective ones of the said beams.

* * * * *